United States Patent
Ishida et al.

(10) Patent No.: US 9,960,431 B2
(45) Date of Patent: May 1, 2018

(54) CATALYST FOR SOLID POLYMER FUEL CELL AND METHOD FOR MANUFACTURING THE SAME

(71) Applicant: TANAKA KIKINZOKU KOGYO K.K., Tokyo (JP)

(72) Inventors: Minoru Ishida, Hiratsuka (JP); Hitoshi Nakajima, Hiratsuka (JP); Koichi Matsutani, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 286 days.

(21) Appl. No.: 14/766,236

(22) PCT Filed: Feb. 12, 2014

(86) PCT No.: PCT/JP2014/053122
§ 371 (c)(1),
(2) Date: Aug. 6, 2015

(87) PCT Pub. No.: WO2014/126077
PCT Pub. Date: Aug. 21, 2014

(65) Prior Publication Data
US 2016/0013495 A1    Jan. 14, 2016

(30) Foreign Application Priority Data
Feb. 15, 2013 (JP) ................. 2013-027758

(51) Int. Cl.
*H01M 4/92* (2006.01)
*H01M 4/88* (2006.01)
*H01M 8/1018* (2016.01)

(52) U.S. Cl.
CPC ......... *H01M 4/926* (2013.01); *H01M 4/8842* (2013.01); *H01M 4/8882* (2013.01);
(Continued)

(58) Field of Classification Search
CPC .... H01M 4/88; H01M 4/8892; H01M 4/8882; H01M 4/8842; H01M 4/921; H01M 4/926
See application file for complete search history.

(56) References Cited

U.S. PATENT DOCUMENTS

| | | | |
|---|---|---|---|
| 2003/0044655 A1* | 3/2003 | Kato | H01M 4/8605 429/524 |
| 2005/0106449 A1 | 5/2005 | Fan et al. | |

(Continued)

FOREIGN PATENT DOCUMENTS

| | | |
|---|---|---|
| JP | H04-141236 A | 5/1992 |
| JP | 2007-209979 A | 8/2007 |

(Continued)

OTHER PUBLICATIONS

PCT, International Search Report PCT/JP2014/053122, dated Apr. 15, 2014.
(Continued)

*Primary Examiner* — Kenneth J Douyette
(74) *Attorney, Agent, or Firm* — Orrick, Herrington & Sutcliffe LLP; Joseph A. Calvaruso

(57) ABSTRACT

Provided is a catalyst for solid polymer fuel cell that exhibits excellent initial activity and favorable durability and a method for manufacturing the same. The invention is a catalyst for solid polymer fuel cell which is formed by supporting catalyst particles including platinum, cobalt and manganese on a carbon powder carrier, wherein a composition ratio (molar ratio) among platinum, cobalt and manganese in the catalyst particles is Pt:Co:Mn=1:0.06 to 0.39: 0.04 to 0.33, a peak intensity ratio of a Co—Mn alloy appearing in the vicinity of $2\theta=27°$ is 0.15 or less with respect to a main peak appearing in the vicinity of $2\theta=40°$ in X-ray diffraction analysis of the catalyst particles, and a fluorine compound having a C—F bond is supported at least (Continued)

on the surface of the catalyst particles. The amount of the fluorine compound supported is preferably from 3 to 20% with respect to the entire mass of the catalyst.

16 Claims, 1 Drawing Sheet

(52) U.S. Cl.
CPC ......... *H01M 4/8892* (2013.01); *H01M 4/921* (2013.01); *H01M 2008/1095* (2013.01)

(56) References Cited

U.S. PATENT DOCUMENTS

| | | | |
|---|---|---|---|
| 2007/0082256 A1 | 4/2007 | Debe et al. | |
| 2008/0032181 A1* | 2/2008 | Yamamoto | H01M 4/8605 429/480 |
| 2008/0280190 A1* | 11/2008 | Dopp | B82Y 30/00 429/494 |
| 2010/0047668 A1* | 2/2010 | Steinbach | H01M 4/8657 429/524 |
| 2012/0028154 A1* | 2/2012 | Owejan | H01M 4/8626 429/434 |

FOREIGN PATENT DOCUMENTS

| | | |
|---|---|---|
| JP | 2009-512163 A | 3/2009 |
| JP | 2009-523066 A | 6/2009 |
| JP | 2011-150867 A | 8/2011 |

OTHER PUBLICATIONS

EP, Extended European search report, including supplementary European search report and European search opinion, Reference RPS/P142249EP0O, Application No./Patent No. 14751518.3-1373 / 2958173, PCT/JP2014053122, dated Sep. 7, 2016.

* cited by examiner

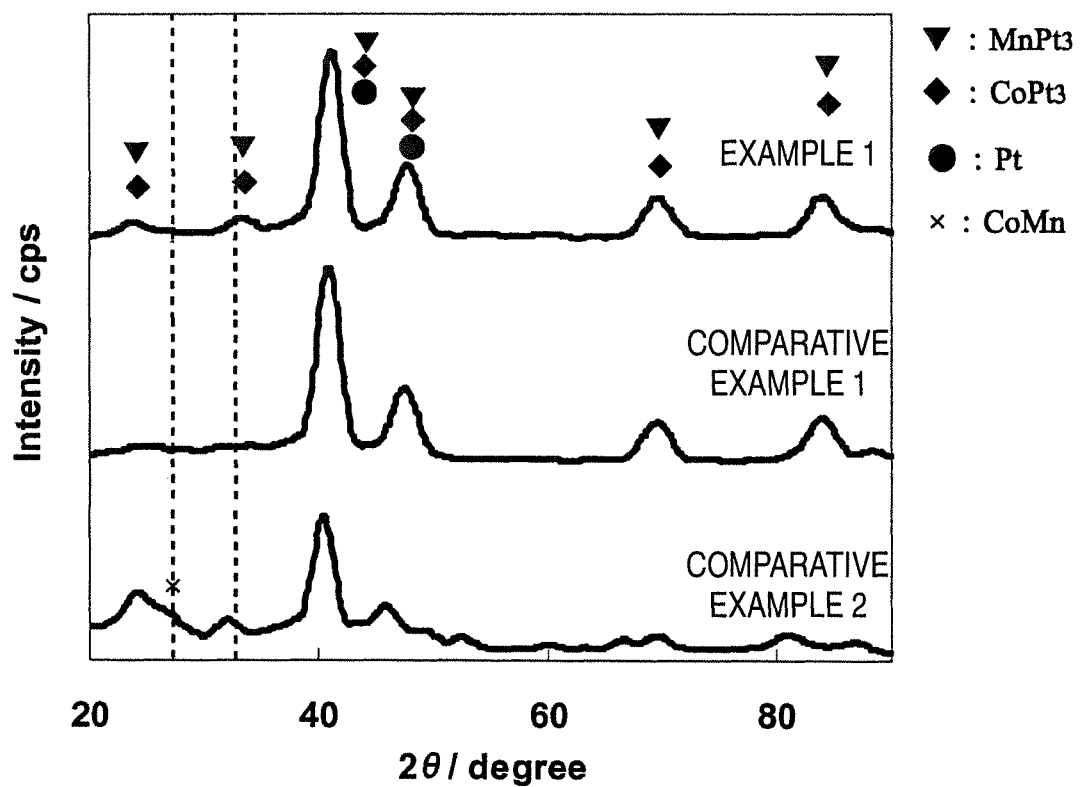

CATALYST FOR SOLID POLYMER FUEL CELL AND METHOD FOR MANUFACTURING THE SAME

TECHNICAL FIELD

The invention relates to a catalyst for solid polymer fuel cell. In particular, it relates to a useful catalyst for use in a cathode (air electrode) of a solid polymer fuel cell.

BACKGROUND ART

A solid polymer fuel cell has advantages that the operating temperature is lower and the fuel cell itself is compact as compared to fuel cells of other types, and it is expected as a promising power source for home use and automobiles for these advantages. A solid polymer fuel cell has a layered structure consisting of a hydrogen electrode, an air electrode and a solid polymer electrolyte membrane sandwiched between these electrodes. Incidentally, a fuel containing hydrogen is supplied to a hydrogen electrode and oxygen or air is supplied to an air electrode, respectively, and electric power is drawn out by oxidation and reduction reactions that occur in each electrode. Moreover, a mixture of a catalyst for promoting the electrochemical reaction and the solid electrolyte is generally applied to both electrodes.

As the catalyst constituting the electrodes described above, a noble metal, in particular a platinum catalyst supporting platinum is widely used as a catalyst metal hitherto. This is because platinum as a catalyst metal exhibits high activity upon promoting the electrode reaction in both the fuel electrode and the hydrogen electrode.

Here, the investigation cases on a platinum alloy catalyst to apply an alloy of platinum and another metal as a catalyst metal have increased in recent years in order to secure the catalytic activity while decreasing the amount of platinum used for the cost reduction of a catalyst. As the platinum alloy catalyst, a Pt—Co catalyst adopting an alloy of platinum and cobalt as catalyst particles is known as a catalyst that is able to exert higher activity than that of the platinum catalyst even though the amount of platinum used is decreased. Moreover, a ternary alloy catalyst in which a third alloying element is alloyed in order to further improve the Pt—Co catalyst has also been reported (Patent Document 1).

RELATED ART DOCUMENT

Patent Document

Patent Document 1: JP 2011-150867 A

SUMMARY OF THE INVENTION

Problems to be Solved by the Invention

As the properties required for practical use of the solid polymer fuel cell, durability, namely, maintenance properties of the catalytic activity are mentioned in addition to favorable initial activity. It can be said to extend the time until the activation loss of the catalyst is essential for practical use of the fuel cell although it is not possible to avoid a time dependently generated decrease in activity (activation loss) of the catalyst. In particular, the cathode catalyst of a solid polymer fuel cell is exposed to a strong acidic atmosphere at a relatively high temperature of about 80° C. and further is used under a severe condition for receiving a high potential load, and thus an improvement in durability performance has been a great challenge for practical use of a solid polymer fuel cell.

The platinum alloy catalyst including the Pt—Co catalyst is a catalyst which has been subjected to the investigations to a certain extent from the viewpoint of the cost reduction or the initial activity. However, it can be said that a further improvement in durability is required in consideration that the recent spread of fuel cells has become realistic. In view of such a circumstance, the invention provides an alloy catalyst for solid polymer fuel cell which is obtained by alloying platinum and another metal and exhibits improved durability as well as excellent initial activity.

Means for Solving the Problems

The invention for solving the above problem is a catalyst for solid polymer fuel cell which is formed by supporting catalyst particles including platinum, cobalt and manganese on a carbon powder carrier, in which a composition ratio (molar ratio) among platinum, cobalt and manganese in the catalyst particles is Pt:Co:Mn=1:0.06 to 0.39:0.04 to 0.33, a peak intensity ratio of a Co—Mn alloy appearing in the vicinity of $2\theta=27°$ is 0.15 or less with respect to a main peak appearing in the vicinity of $2\theta=40°$ in X-ray diffraction analysis of the catalyst particles, and a fluorine compound is supported at least on a surface of the catalyst particles.

The invention is a manganese-added ternary catalyst based on a Pt—Co catalyst exhibiting relatively excellent initial activity. Incidentally, the configuration of the metal phase of the ternary catalyst is that the Co—Mn alloy phase is limited in a certain amount or less and a water-repellent agent including a fluorine compound is contained. Hereinafter, the catalyst according to the invention will be described together with these features.

In the invention, the reason to apply a ternary catalyst of Pt—Co—Mn is because there is a possibility to exert activity that is equal to or higher than that of a conventional Pt—Co catalyst by addition of manganese as the result of a screening test by the present inventors. It is discussed that this is because four-electron reduction function of oxygen molecule is more efficiently exerted and thus the catalytic activity is improved as manganese is added to the Pt—Co catalyst as a third metal element. Incidentally, the composition ratio among platinum, cobalt and manganese is set to be Pt:Co:Mn=1:0.06 to 0.39:0.04 to 0.33 in order that the ternary catalyst exerts initial activity that is equal to or higher than that of the Pt—Co catalyst. Manganese is required to be added in a certain amount but an excessive addition rather causes a decrease in activity. The composition ratio needs to be set since the activity of the ternary catalyst becomes approximately equivalent to or lower than that of the conventional Pt—Co catalyst when the composition ratios of cobalt and manganese are out of the above range. Meanwhile, more preferred range of the composition ratios of cobalt and manganese is Pt:Co:Mn=1:0.06 to 0.26:0.09 to 0.33, and the maximum initial activity is exhibited in this range.

Incidentally, manganese does not only have to be added but is required to be in a predetermined existing form in the relation with other constituent elements (platinum, cobalt) constituting the catalyst particles. In other words, as the metal phase constituting the catalyst particles in the ternary catalyst of Pt—Co—Mn, basically an alloy phase in which the respective metals are alloyed with one another is the main phase although there is a possibility that a Pt phase partially remains. As this alloy phase, a Mn—Pt alloy phase (MnPt$_3$), a Co—Pt alloy phase (CoPt$_3$) and a Mn—Co alloy phase (MnCo) are considered. The kind and abundance of these alloy phases are considered to differ depending on the manufacturing process of the catalyst.

The present inventors have investigated the effect of the respective alloy phases on the catalytic activity and found out that the initial activity greatly decreases to lose the effect of manganese addition in a case in which the Mn—Co alloy phase is present in the catalyst particles. The factor for this is not clear, but it is assumed that this is because the active species of the ternary catalyst of Pt—Co—Mn is presumed to be the Mn—Pt alloy phase and the Co—Pt alloy phase and the formation of the above active species is inhibited in a case in which Mn added and Co are not alloyed with Pt but form a Mn—Co alloy phase.

Hence, in the invention, the peak intensity of the Co—Mn alloy in the X-ray diffraction analysis of the catalyst particles is regulated in order to limit the abundance of the Mn—Co alloy phase. Specifically, the peak intensity ratio of the Co—Mn alloy appearing in the vicinity of $2\theta=27°$ is set to 0.15 or less with respect to the main peak appearing in the vicinity of $2\theta=40°$. The reason to set the peak ratio that indicates the abundance of the Mn—Co alloy phase to 0.15 or less is because the upper limit for obtaining a suitable catalyst need to be defined since the Mn—Co alloy phase adversely affects the catalytic activity as described above. Consequently, this peak ratio may be 0, which is rather preferable.

The reason to use the result of the X-ray diffraction analysis for regulating the abundance of the Mn—Co alloy phase is because the state of the catalyst particles can be accurately measured by the X-ray diffraction analysis while it is a relatively simple analytical method and the X-ray diffraction analysis also exhibits quantitativity as a reference peak is properly set. As described above, in the invention, the main peak (synthetic peak of Pt, MnPt$_3$ and CoPt$_3$) appearing at $2\theta=40°$ to $41°$ is used as the reference peak and the peak in the vicinity of $2\theta=27°$ is applied as the peak of the Mn—Co alloy phase. Meanwhile, the peak of the Mn—Co alloy phase also appears in the vicinity of 33°, 43°, 52° and 76° in some cases. However, the peak in the vicinity of $2\theta=27°$ is highly sensitive to the presence or absence of the Mn—Co alloy phase and thus this peak is applied.

In addition, with regard to the distribution of the alloy phases constituting the catalyst particles, it is preferable that the Mn—Pt alloy phase (MnPt$_3$) and the Co—Pt alloy phase (CoPt$_3$) be formed as much as the Mn—Co alloy phase decreases as described above. These alloy phases have the four-electron reduction action of the oxygen molecule and contribute to an improvement in activity. In the X-ray diffraction analysis, although all of these alloy phases appear in the vicinity of $2\theta=24°$, 32° and 41°, it is preferable to judge by the peak appearing in the vicinity of $2\theta=32°$. The peak derived from these two alloy phases is a synthetic peak of the peak of the Mn—Pt alloy phase and the peak of the Co—Pt alloy phase and thus is hardly separated. Hence, it is preferable to confirm the formation of these alloy phases by the intensity of this synthetic peak. Incidentally, as the preferred peak intensity, the peak intensity appearing in the vicinity of $2\theta=32°$ is preferably 0.13 or more with respect to the main peak appearing at $2\theta=40°$ to $41°$. Meanwhile, the preferred upper limit of this peak intensity ratio is about 0.23.

Incidentally, the setting of the composition ratio among platinum, cobalt and manganese and the regulation of the Mn—Co alloy phase described above are a configuration which contributes to an improvement in initial activity of the catalyst. An improvement in initial activity is a primarily prioritized matter in an improvement in catalytic properties, and it is possible to maintain the activity even in a long term use by enhancing the initial activity. However, it is not possible to obtain a catalyst excellent in durability by only improving the initial activity but securing of durability is achieved by suppressing a time dependent drop in activity.

With regard to this challenge to improve durability, several factors such as coarsening of catalyst particles are considered as the factor of a time dependent decrease in activity of the catalyst. Here, the present inventors have focused on the degradation due to elution of the metals (platinum, cobalt, manganese) constituting the catalyst particles among them. The mechanism of this degradation is the loss of the respective metals by the electrochemical dissolution mediated by water produced by the fuel cell reaction on the cathode side. As described above, the catalyst on the cathode side is exposed to an atmosphere such as a high temperature, an acidic atmosphere and a high potential load, and thus the dissolution and elution of the metals are accelerated when water is present in this atmosphere.

Hence, in the invention, it was decided to form a water-repellent layer including a fluorine compound having a C—F bond on the surface of the catalyst particles. A fluorine compound having a high bonding power of the C—F bond exhibits high stability and is known to have a unique nature such as water repellency. In the invention, it is intended to prevent a decrease in activity by forming a water-repellent layer including this fluorine compound on the catalyst to rapidly discharge produced water from the surface of the catalyst particles and thus to suppress the dissolution of the catalyst metals mediated by water.

As the fluorine compound constituting this water-repellent layer, there are a fluorine resin that is a water-repellent polymer material, a fluorine-based surface active agent and the like. For example, polytetrafluoroethylene (PTFE) known as Teflon (registered trademark), a tetrafluoroethylene-perfluoroalkyl vinyl ether copolymer (PFA), a tetrafluoroethylene-hexafluoropropylene copolymer (FEP), a tetrafluoroethylene-ethylene copolymer (ETFE), polyvinylidene fluoride (PVDF), polychlorotrifluoroethylene (PCTFE), a perfluorosulfonic acid-based polymer known as Nafion (registered trademark) or a perfluoroacrylic acid ester known as fluorinated acrylate is mentioned. In addition, a perfluorobutanesulfonic acid group (PFBS) based surface active agent is also effective as the fluorine-based surface active agent.

In the invention, the supported amount of the fluorine compound that forms the water-repellent layer is preferably set to from 3 to 20% by mass with respect to the entire mass of the catalyst. This is because there is no effect when the supported amount is less than 3% by mass and the original function of the catalyst to promote the electrode reaction cannot be exerted when the supported amount is more than 20% by mass. The supported amount is more preferably from 8 to 20% by mass.

Meanwhile, the water-repellent layer does not need to be formed over the entire surface of all the catalyst particles but may be partially formed. In addition, the water-repellent layer may be formed only on the catalyst particles but the catalytic activity is not affected even when the fluorine compound is supported on the carrier.

In the invention, the catalyst particles are preferably those which have an average particle size of from 2 to 20 nm. This is because long-term activity maintenance properties cannot be clearly obtained when the average particle size is less than 2 nm and the initial activity of the catalyst cannot be sufficiently obtained when the average particle size is more than 20 nm. In addition, as the carbon powder of a carrier, it is preferable to apply a carbon powder having a specific surface area of from 250 to 1200 $m^2/g$. This is because it is possible to increase the area in which the catalyst adheres by setting the specific surface area to 250 $m^2/g$ or more and thus it is possible to increase the effective surface area by dispersing the catalyst particles in a high state. On the other hand, the existing proportion of the ultrafine pores (about less than 20 Å) into which the ion exchange resin hardly penetrates when forming the electrode increases and thus the utilization efficiency of the catalyst particles decreases when the specific surface area is more than 1200 $m^2/g$.

In addition, with regard to the catalyst according to the invention, it is preferable that the supporting density of the catalyst particles be set to from 30 to 70% in consideration of the performance as an electrode of the solid polymer fuel cell. The supporting density herein means the ratio of the mass (total mass of platinum, cobalt and manganese supported) of the catalyst particles to be supported on a carrier to the entire mass of the catalyst.

Next, the method for manufacturing a catalyst for solid polymer fuel cell according to the invention will be described. Upon the manufacture of the catalyst according to the invention, the basic process conforms to a general manufacturing method of an alloy catalyst, and the metals to be the catalyst particles are supported on a carrier, appropriately dried and then subjected to a heat treatment so as to alloy the metals supported. However, for the catalyst according to the invention, it is required to suppress excessive formation of the Mn—Co alloy phase in the catalyst particles.

For the adjustment of the alloy phase in the catalyst particles, in the invention, it is essential to first prepare a catalyst supporting only platinum and to support cobalt and manganese on this in the step of supporting a catalyst metal. In order to support the catalyst metals, it is general and also efficient to simultaneously support the constituent metals on the carrier (see Examples of Patent Document 1), but the Mn—Co alloy phase is formed in an amount more than the regulated value of the invention by such simultaneous supporting. The factor that the formation of the Mn—Co alloy phase is suppressed as a platinum catalyst is first prepared (manufactured) and cobalt and manganese are then separately supported on the platinum catalyst is not clear, but it is considered that the alloying of platinum and cobalt and the alloying of platinum and manganese are facilitated by virtue of this and thus the formation of the Mn—Pt alloy phase ($MnPt_3$) and the Co—Pt alloy phase ($CoPt_3$) is prioritized.

For the preparation of the platinum catalyst, a platinum catalyst obtained by a conventional manufacturing method of a platinum catalyst may be prepared. A commercially available platinum catalyst may also be utilized. Typically, a platinum catalyst is manufactured by bringing a platinum salt solution into contact (impregnation, dropping) with a carrier and then forming platinum particles by a reduction treatment.

The supporting of cobalt and manganese on the platinum catalyst itself is also conducted by a general method. Metal salt solutions of cobalt and manganese are brought into contact with the platinum catalyst and cobalt and manganese in a metal state are precipitated in the vicinity of the platinum particles by a reduction treatment. It is possible to use cobalt chloride hexahydrate, cobalt nitrate, cobalt acetate tetrahydrate and the like as the metal salt solution of cobalt, and it is possible to use manganese chloride tetrahydrate, manganese nitrate hexahydrate, manganese acetate tetrahydrate and the like as the metal salt solution of manganese. The order of bringing the metal salt solutions into contact with the platinum catalyst at this time is not particularly limited, and either metal salt solution may be previously brought into contact with the platinum catalyst or a mixture of the metal salt solutions of cobalt and manganese may be brought into contact with the platinum catalyst.

Meanwhile, with regard to the amount of cobalt and manganese supported, the concentration and amount of the metal salt solutions may be set so as to have the ratio that is set within the range of the composition ratios of cobalt and manganese described above while considering the amount of the platinum catalyst supported. However, the amount of cobalt and manganese supported is desirably about from 1.5 to 5 times for cobalt and about from 1.5 to 3 times for manganese with respect to the composition ratio set in the case of conducting the treatment with an oxidizing solution to be described later.

After supporting cobalt and manganese on the platinum catalyst, drying is conducted if necessary and the respective metals are then alloyed by the heat treatment. Here, the heat treatment temperature for the alloying is set to from 700 to 1100° C. The alloying, particularly the formation of the Mn—Pt alloy phase and the Co—Pt alloy phase is insufficient and thus a catalyst exhibiting poor activity is obtained when the heat treatment is conducted at lower than 700° C. In addition, the alloying more easily proceeds and the formation of the Mn—Pt alloy phase and the Co—Pt alloy phase is also promoted as the heat treatment temperature is higher, but coarsening of the catalyst particles is concerned and there are difficulties for the facility when the heat treatment is conducted at higher than 1100° C. and thus the upper limit is set to 1100° C. This heat treatment is preferably conducted in a non-oxidizing atmosphere and particularly preferably conducted in a reducing atmosphere (hydrogen gas atmosphere and the like).

The catalyst that has undergone the heat treatment step described above becomes a ternary catalyst of Pt—Co—Mn having the catalyst particles in which the Mn—Co alloy phase is decreased in amount and the formation of the Mn—Pt alloy phase and the Co—Pt alloy phase is promoted and exhibiting excellent initial activity.

Thereafter, a water-repellent layer is formed on the surface of the catalyst particles. This treatment is a treatment in which the ternary catalyst of Pt—Co—Mn manufactured above is immersed in a fluorine compound solution, and the solvent of the fluorine compound solution is removed by volatilization or evaporation so as to support the fluorine compound on the catalyst. Here, the fluorine compound solution is one obtained by dissolving the fluorine compound in a solvent that is capable of dissolving the above fluorine compound, and the solvent may be either a fluorine-based solvent or a nonfluorine-based solvent. At this time, the amounts of the solvent and fluorine compound are adjusted such that the content of fluorine in the fluorine compound solution is equal to the amount of fluorine to be supported on the catalyst.

It is preferable to conduct the immersion treatment for supporting the fluorine compound for an immersion time of from 1 to 48 hours while stirring. The temperature of the fluorine compound solution is set to from 30 to 150° C., but it is selected depending on the kind of solvent. Incidentally, after the immersion, the fluorine compound solution in which the catalyst is dispersed is warmed using a dryer or the like and kept until the entire solvent disappears.

It is possible to manufacture the catalyst according to the invention by the treatments described above. Meanwhile, in the above manufacturing process, it is preferable to bring the catalyst before supporting the fluorine compound into contact with an oxidizing solution at least one time after the heat treatment for alloying. The ratios of cobalt and manganese are important in the catalyst particles of the catalyst according to the invention, but it is difficult to perform the adjustment by only the supporting step of cobalt and manganese in some cases. Accordingly, it is possible to adjust the supported amount by supporting cobalt and manganese in an amount more than the intended ratio in the supporting step and eluting cobalt and manganese through a treatment with an oxidizing solution.

As the oxidizing solution used in this treatment step, a solution of sulfuric acid, nitric acid, phosphorous acid, potassium permanganate, hydrogen peroxide, hydrochloric acid, chloric acid, hypochlorous acid, chromic acid or the like is preferable. The concentration of these oxidizing solutions is preferably set to from 0.1 to 1 mol/L, and it is preferable to immerse the catalyst in the solution. As the conditions for the treatment with an oxidizing solution, the contact time is preferably from 1 to 10 hours and the treatment temperature is preferably from 40 to 90° C. Meanwhile, the treatment with an oxidizing solution may be conducted not only one time but also plural times by bringing the catalyst into contact with an oxidizing solution. In addition, the kind of solution may be changed for each treatment in the case of conducting the acid treatment plural times.

Advantageous Effects of the Invention

The catalyst for solid polymer fuel cell according to the invention exhibits excellent initial activity by limiting the composition ratios of cobalt and manganese and further specifying the alloy phase in the catalyst particles while employing the form of a ternary catalyst obtained by addition of manganese to a Pt—Co catalyst as described above. In addition, it is possible to secure durability by suppressing the electrochemical dissolution of the catalyst metal through the formation of a water-repellent layer including a fluorine compound at least on the surface of the catalyst particles.

BRIEF DESCRIPTION OF THE DRAWING

FIG. 1 illustrates the X-ray diffraction patterns of the respective catalysts according to Example 1 and Comparative Examples 1 and 2.

DESCRIPTION OF EMBODIMENTS

First Embodiment

A ternary catalyst of Pt—Co—Mn having a water-repellent layer was manufactured and subjected to the evaluation on the initial catalytic activity and durability. The basic process for manufacturing the catalyst is as follows.

[Supporting of Catalyst Metal]

A commercially available platinum catalyst was prepared and cobalt and manganese were supported on this. As the platinum catalyst, 5 g (2.325 g (11.92 mmol) in terms of platinum) of a platinum catalyst having a carbon fine powder (specific surface area of about 900 m$^2$/g) as the carrier and a platinum supporting rate of 46.5% by mass was prepared. This platinum supporting catalyst was immersed in a metal salt solution obtained by dissolving cobalt chloride ($CoCl_2 \cdot 6H_2O$) and manganese chloride ($MnCl_2 \cdot 4H_2O$) in 100 mL of ion exchanged water and stirred using a magnetic stirrer. Thereafter, 500 mL of a sodium borohydride (SBH) solution having a concentration of 1% by mass was added dropwise to this solution and stirred to conduct the reduction treatment, whereby cobalt and manganese were supported on the platinum catalyst. After that, the catalyst thus obtained was filtered, washed and dried.

[Heat Treatment for Alloying]

The catalyst supporting the catalyst metals was subjected to the heat treatment for alloying. In the present embodiment, the heat treatment was conducted at the heat treatment temperature of 900° C. for 30 minutes in 100% hydrogen gas.

[Treatment with Oxidizing Solution]

The catalyst after the heat treatment for alloying was treated with an oxidizing solution. This treatment was conducted as follows. The catalyst after the heat treatment was treated in a 0.2 mol/L aqueous solution of sulfuric acid at 80° C. for 2 hours, then filtered, washed and dried. After that, the catalyst was treated in a 1.0 mol/L aqueous solution of nitric acid (dissolved oxygen of 0.01 cm$^3$/cm$^3$ (in terms of STP)) at 70° C. for 2 hours, then filtered, washed and dried.

[Formation of Water-Repellent Layer]

Subsequently, the ternary catalyst of Pt—Co—Mn thus manufactured was treated with a fluorine compound solution to form a water-repellent layer. As the fluorine compound solution, a solution obtained by dissolving 20 mL of a commercially available fluorine resin material (trade name: EGC-1700, manufactured by Sumitomo 3M Limited, fluorine resin content of 1 to 3%)) in 20 mL of hydrofluoroether (trade name: HFE-7100 manufactured by Sumitomo 3M Limited) of the solvent was used. In this treatment, 5 g of the catalyst was immersed in the above fluorine compound solution and stirred at 60° C. for 5 hours and then kept at 60° C. in a dryer to evaporate the solvent until the solvent completely disappeared. The fluorine compound was supported on the catalyst by this treatment, whereby a catalyst having a water-repellent layer was manufactured (Example 1).

Example 2

As the fluorine compound solution, a commercially available fluorinated ethylene propylene resin: (trade name: Teflon (registered trademark) FEP-120J, manufactured by Du Pont-Mitsui Fluorochemicals Co., Ltd.) was used. In this treatment, 3.4 g of the catalyst was immersed in the above fluorine compound solution and stirred at 60° C. for the night and then kept at 60° C. in a dryer to evaporate the solvent until the solvent completely disappeared. After that, the catalyst was heated at 340° C. for 30 minutes in $N_2$. The fluorine compound was supported on the catalyst by this treatment, whereby a catalyst having a water-repellent layer was manufactured.

Reference Example 1

A catalyst in which the ternary catalyst of Pt—Co—Mn after the heat treatment was not treated with a fluorine compound solution in the catalyst manufacturing process described above was prepared. In other words, a catalyst on which a water-repellent layer was not formed while in which the composition ratio among platinum, cobalt and manganese and the state of the alloy phases were optimized was prepared.

Comparative Example 1

In addition, as a Comparative Example to Example 1, a conventional Pt—Co catalyst was manufactured without adding manganese. This Comparative Example was manufactured by immersing a platinum catalyst in a solution containing only a cobalt salt.

Comparative Example 2

A ternary catalyst of Pt—Co—Mn was manufactured by simultaneously supporting platinum, cobalt and manganese in the supporting step of the catalyst metals. A carbon carrier (specific surface area of about 900 m$^2$/g) was prepared by 5 g, and this was immersed in a metal salt solution obtained by dissolving predetermined amounts of a Pt dinitrodiamine nitrate solution ($Pt(NO_2)_2(NH_3)_2$), cobalt chloride ($CoCl_2.6H_2O$) and manganese chloride ($MnCl_2.4H_2O$) in 100 mL of ion exchanged water and stirred using a magnetic stirrer. Thereafter, 500 mL of a sodium borohydride (SBH) solution having a concentration of 1% by mass was added dropwise to this solution and stirred to conduct the reduction treatment, whereby platinum, cobalt and manganese were supported on the carbon carrier. After that, the catalyst thus obtained was filtered, washed, dried, and alloyed by being subjected to the heat treatment at 900° C. for 30 minutes under a stream of hydrogen.

For the catalyst (Example 1) subjected to the treatment with a fluorine compound solution, the amount of the fluorine compound supported was measured as well as for the catalysts manufactured above, the ratio among platinum, cobalt and manganese in the catalyst particles was measured. These measurements were carried out as follows. The ICP analysis of the catalysts was conducted, the mass ratios of the respective metals and the carbon carrier were measured, and the values were calculated based on the measured values of those.

In addition, the X-ray diffraction analysis was conducted for the respective catalysts and the composition of the catalyst particles was investigated. JDX-8030 manufactured by JEOL Ltd. was used as the X-ray diffraction apparatus. The samples were made into a fine powder form and introduced into a glass cell, and the analysis was conducted using a Cu (kα ray) as the X-ray source at a tube voltage of 40 kV, a tube current of 30 mA, 2θ=20 to 90°, a scanning speed of 7°/min and a step angle of 0.1°.

FIG. 1 illustrates the X-ray diffraction patterns of the respective catalysts. From FIG. 1, the peak appearing in the vicinity of 2θ=40° which is observed in all of the catalysts is a synthetic peak of metallic Pt, $CoPt_3$ and $MnPt_3$ (Example 1). In addition, the peak in the vicinity of 2θ=32° (32 to 34°) for Example 1 is a synthetic peak of $MnPt_3$ and $CoPt_3$ which is not affected by metallic Pt. On the other hand, in Comparative Example 2, a peak which is almost not observed in each of Examples and Comparative Examples is observed in the vicinity of 2θ=27° and this is considered to be derived from the Co—Mn alloy.

Next, the catalysts of Examples 1 and 2, Reference Example 1 and Comparative Examples 1 and 2 were subjected to the initial performance test. This performance test was conducted by measuring the mass activity. A single cell was used in the experiment, and a membrane electrode assembly (MEA) in which a proton-conducting polymer electrolyte membrane was sandwiched between a cathode electrode and an anode electrode having an electrode area of 5 cm×5 cm=25 cm$^2$ was fabricated and evaluated. As a pre-treatment, a current/voltage curve was created under the conditions of hydrogen flow rate=1000 mL/min, oxygen flow rate=1000 mL/min, cell temperature=80° C., anode humidification temperature=90° C. and cathode humidification temperature=30° C. After that, the mass activity was measured as the main measurement. The test method was as follows. The current value (A) at 0.9 V was measured, the current value (A/g-Pt) per 1 g of Pt was determined from the weight of Pt coated on the electrode, and the mass activity was calculated. The results are shown in Table 1. Meanwhile, in Table 1, the peak intensity ratio of the Co—Mn alloy (in the vicinity of 2θ=27°) calculated from the X-ray diffraction patterns of the respective catalysts of FIG. 1 and the peak intensity ratio of $MnPt_3$ and $CoPt_3$ (in the vicinity of 2θ=32°) are also shown.

TABLE 1

| | PT:Co:Mn | Mass Activity*[1] (A/g-pt at 0.9 V) | Amount of fluorine compound supported*[2] | Peak intensity ratio*[3] Co—Mn | $MnPt_3$ + $CoPt_3$ |
|---|---|---|---|---|---|
| Example 1 | 1:0.26:0.09 | 1.16 | 19.6% | 0.10 | 0.26 |
| Example 2 | 1:0.29:0.07 | 1.06 | 18.7% | 0.07 | 0.13 |
| Reference Example 1 | 1:0.26:0.09 | 1.13 | — | 0.10*[4] | 0.26*[4] |
| Comparative Example 1 | 1:0.38:0 | 1.0 | — | — | 0.11 |
| Comparative Example 2 | 1:0.25:0.36 | 0.93 | — | 0.33 | 0.28 |

*[1]It is a relative comparison when taking Comparative Example 1 (Pt—Co catalyst) as 1.0.
*[2]it is a value with respect to the entire mass of catalyst.
*[3]It is an intensity ratio with respect to the main peak in the vicinity of 2θ = 40°.
*[4]Reference Example 1 differs from Example 1 only in the presence or absence of a fluoride and thus there is no difference in the X-ray pattern between them.

From Table 1, all of the ternary catalysts of Pt—Co—Mn according to Examples and Reference Example exert favorable initial activity when taking the Pt—Co catalyst of Comparative Example 1 as the reference. This is considered to be due to the properly adjusted composition (amount of Co—Mn phase formed) of the catalyst particles as well as addition of manganese. Examples supporting a fluorine compound exhibit a little superior initial activity than Reference Example but the difference is not significant when Examples and Reference Example are compared to each other. In addition, it has been confirmed that the catalyst in a case in which a great amount of the Co—Mn phase are formed as in Comparative Example 2 is inferior to the Pt—Co catalyst (Comparative Example 1) in initial activity.

Next, Examples 1 and 2, Reference Example 1 and Comparative Example 1 were subjected to a durability test for the durability evaluation. As the durability test, a cathode electrode (air electrode) was manufactured from the catalyst, a fuel cell was then configured and subjected to the accelerated degradation test to sweep the cell potential of the cathode with a triangular wave, and the power generation properties of the fuel cell after degradation were measured. As the accelerated degradation, the surface of the catalyst particles was cleaned by being swept between 650 and 1050 mV at a sweep rate of 40 mV/s for 20 hours and then degraded by being swept between 650 and 1050 mV at a sweep rate of 100 mV/s for 20 hours, 40 hours and 68 hours. The mass activity was measured for the catalyst after degradation under each condition. The evaluation results after this accelerated degradation test are shown in Table 2.

TABLE 2

|  | PT:Co:Mn | Mass Activity*1 (A/g-pt at 0.9 V) | | | |
|---|---|---|---|---|---|
|  |  | Initial | 20 hours | 44 hours | 68 hours |
| Example 1 | 1:0.26:0.09 | 1.16 | 1.02 | 0.62 | 0.48 |
| Example 2 | 1:0.26:0.09 | 1.06 | 0.82 | 0.66 | 0.49 |
| Reference Example 1 | 1:0.26:0.09 | 1.13 | 0.67 | 0.46 | 0.28 |
| Comparative Example 1 | 1:0.38:0. | 1.0 | 0.83 | 0.59 | 0.37 |

*[1] It is a value obtained by taking the Pt—Co catalyst (Comparative Example 1) before degradation as "1.0".

From Table 2, in the catalysts on which a water-repellent layer is formed according to Examples 1 and 2, a drop in activity after accelerated degradation is suppressed compared to the conventional Pt—Co catalyst (Comparative Example 1). Meanwhile, the catalyst which does not have a water-repellent layer according to Reference Example 1 is inferior to the Pt—Co catalyst according to Comparative Example 1. Upon discussing the factor of this, the reason is considered to be because the elution of the metals (cobalt and/or manganese) more easily proceeds than the elution of the Pt—Co catalyst under the harsh potential condition (650 to 1050 mV) in this durability test. In this regard, it can be confirmed that the investigation considering not only the initial activity but also the durability is important upon the development of a catalyst since Reference Example 1 exhibits excellent initial activity (Table 1).

Second Embodiment

Here, the catalyst was manufactured by the same process as the first embodiment with the amount of the fluorine compound supported changed and subjected to the evaluation on the initial activity. The amount of the fluorine compound supported was changed by adjusting the amount of the fluorine resin material to be dissolved in the solvent for the fluorine compound solution. The treatment conditions other than that were the same as the first embodiment. Thereafter, the mass activity was measured in the same manner as in the first embodiment. The results are shown in Table 3.

TABLE 3

|  | PT:Co:Mn | Mass Activity*1 (A/g-pt at 0.9 V) | Amount of fluorine compound supported*2 |
|---|---|---|---|
| Example 1 | 1:0.26:0.09 | 1.16 | 19.6% |
| Example 3 | 1:0.33:0.07 | 1.18 | 8.6% |
| Example 4 | 1:0.31:0.07 | 0.76 | 24.5% |
| Example 5 | 1:0.31:0.07 | 0.45 | 36.7% |
| Comparative Example 1 | 1:0.39:0 | 1.0 | — |

*[1] It is a relative comparison when taking Comparative Example 1 (Pt—Co catalyst) as 1.0.
*[2] It is a value with respect to the entire mass of catalyst.

From the first embodiment, it has been confirmed that the effect of supporting a fluorine compound is exhibited to secure durability but not to improve the initial activity. From Table 3, it can be seen that the initial activity decreases when the amount of the fluorine compound supported is more than 20% to be excessive.

INDUSTRIAL APPLICABILITY

According to the invention, it is also possible to achieve an improvement in durability of an electrode catalyst for solid polymer fuel cell while improving the initial power generation properties as the electrode catalyst. The invention contributes to the spread of a fuel cell and is consequently to be a foundation of the environmental problem solution.

The invention claimed is:

1. A catalyst for solid polymer fuel cell having catalyst particles comprising platinum, cobalt and manganese supported on a carbon powder carrier, wherein
   a composition ratio (molar ratio) among platinum, cobalt and manganese in the catalyst particles is Pt:Co:Mn=1: 0.06 to 0.39:0.04 to 0.33,
   a peak intensity ratio of a Co—Mn alloy appearing in the vicinity of 2θ=27° is 0.15 or less with respect to a main peak appearing in the vicinity of 2θ=40° in X-ray diffraction analysis of the catalyst particles, and
   a fluorine compound having a C—F bond is supported at least on a surface of the catalyst particles,
   wherein a peak ratio of a CoPt$_3$ alloy and a peak ratio of a MnPt$_3$ alloy appearing in the vicinity of 2θ=32° are each 0.13 or more with respect to a main peak appearing in the vicinity of 2θ=40° in X-ray diffraction analysis of the catalyst particles.

2. The catalyst for solid polymer fuel cell according to claim 1, wherein the fluorine compound is supported from 3 to 20% by mass with respect to the entire mass of the catalyst.

3. The catalyst for solid polymer fuel cell according to claim 1, wherein the fluorine compound is a fluorine resin or a fluorine-based surface active agent.

4. The catalyst for solid polymer fuel cell according to claim 1, wherein a supporting density of the catalyst particles is from 30 to 70%.

5. The catalyst for solid polymer fuel cell according to claim 2, wherein the fluorine compound is a fluorine resin or a fluorine-based surface active agent.

6. The catalyst for solid polymer fuel cell according to claim 2, wherein a supporting density of the catalyst particles is from 30 to 70%.

7. The catalyst for solid polymer fuel cell according to claim 3, wherein a supporting density of the catalyst particles is from 30 to 70%.

8. A method for manufacturing a catalyst for solid polymer fuel cell, the catalyst defined in claim 1, comprising the steps of:
   supporting cobalt and manganese on a platinum catalyst having platinum particles supported on a carbon powder carrier;
   subjecting the platinum catalyst that is formed by the supporting step and supports cobalt and manganese to a heat treatment at from 700 to 1100° C.; and
   forming a water-repellent layer including a fluorine compound on the catalyst by bringing the catalyst after the heat treatment step into contact with a solution containing the fluorine compound.

9. The method for manufacturing a catalyst for solid polymer fuel cell according to claim 8, comprising the step of:
   eluting cobalt and manganese on the surface of the catalyst particles by bringing the catalyst after the heat treatment into contact with an oxidizing solution at least one time.

10. The method for manufacturing a catalyst for solid polymer fuel cell according to claim 9, wherein the oxidizing solution is sulfuric acid, nitric acid, phosphorous acid, potassium permanganate, hydrogen peroxide, hydrochloric acid, chloric acid, hypochlorous acid and chromic acid.

11. The method for manufacturing a catalyst for solid polymer fuel cell according to claim 9, wherein a contact treatment with the oxidizing solution is conducted at a treatment temperature of from 40 to 90° C. for a contact time of from 1 to 10 hours.

12. A method for manufacturing a catalyst for solid polymer fuel cell, the catalyst defined in claim 2, comprising the steps of:
supporting cobalt and manganese on a platinum catalyst having platinum particles supported on a carbon powder carrier;
subjecting the platinum catalyst that is formed by the supporting step and supports cobalt and manganese to a heat treatment at from 700 to 1100° C.; and
forming a water-repellent layer including a fluorine compound on the catalyst by bringing the catalyst after the heat treatment step into contact with a solution containing the fluorine compound.

13. A method for manufacturing a catalyst for solid polymer fuel cell, the catalyst defined in claim 3, comprising the steps of:
supporting cobalt and manganese on a platinum catalyst having platinum particles supported on a carbon powder carrier;
subjecting the platinum catalyst that is formed by the supporting step and supports cobalt and manganese to a heat treatment at from 700 to 1100° C.; and
forming a water-repellent layer including a fluorine compound on the catalyst by bringing the catalyst after the heat treatment step into contact with a solution containing the fluorine compound.

14. A method for manufacturing a catalyst for solid polymer fuel cell, the catalyst defined in claim 1, comprising the steps of:
supporting cobalt and manganese on a platinum catalyst having platinum particles supported on a carbon powder carrier;
subjecting the platinum catalyst that is formed by the supporting step and supports cobalt and manganese to a heat treatment at from 700 to 1100° C.; and
forming a water-repellent layer including a fluorine compound on the catalyst by bringing the catalyst after the heat treatment step into contact with a solution containing the fluorine compound.

15. A method for manufacturing a catalyst for solid polymer fuel cell, the catalyst defined in claim 4, comprising the steps of:
supporting cobalt and manganese on a platinum catalyst having platinum particles supported on a carbon powder carrier;
subjecting the platinum catalyst that is formed by the supporting step and supports cobalt and manganese to a heat treatment at from 700 to 1100° C.; and
forming a water-repellent layer including a fluorine compound on the catalyst by bringing the catalyst after the heat treatment step into contact with a solution containing the fluorine compound.

16. The method for manufacturing a catalyst for solid polymer fuel cell according to claim 10, wherein a contact treatment with the oxidizing solution is conducted at a treatment temperature of from 40 to 90° C. for a contact time of from 1 to 10 hours.

* * * * *